United States Patent [19]
Katznelson

[11] Patent Number: 4,943,847
[45] Date of Patent: Jul. 24, 1990

[54] EXTENDED DEFINITION TELEVISION

[75] Inventor: Ron D. Katznelson, San Diego, Calif.

[73] Assignees: M/A-COM Government Systems, Inc.; Cable/Home Communication Corp., both of San Diego, Calif.

[21] Appl. No.: 909,508

[22] Filed: Sep. 19, 1986

[51] Int. Cl.$^5$ .......................................... H04N 11/14
[52] U.S. Cl. ......................................... 358/12; 358/16
[58] Field of Search ............................. 358/12, 15, 16

[56] References Cited

U.S. PATENT DOCUMENTS

| | | | |
|---|---|---|---|
| 2,793,348 | 5/1957 | Hunter | 358/16 |
| 2,795,643 | 6/1957 | Lockhart | 358/16 |
| 2,898,397 | 8/1959 | Richman | 358/16 |
| 4,318,120 | 3/1982 | Acampora | 358/12 |
| 4,521,803 | 6/1985 | Gittinger | 358/141 |
| 4,543,598 | 9/1985 | Oliphant | 358/12 |
| 4,589,011 | 5/1986 | Rzeszewski | 358/16 |

FOREIGN PATENT DOCUMENTS

| | | | |
|---|---|---|---|
| 2322 | 1/1977 | Japan | 358/15 |
| 852512 | 10/1960 | United Kingdom | 358/16 |
| 858304 | 1/1961 | United Kingdom | 358/15 |
| 2113941 | 8/1983 | United Kingdom | 358/15 |

OTHER PUBLICATIONS

Charles J. Hirsch, Color Television, IEEE Spectrum, Feb. 1968, pp. 62–74, "Quadrature Crosstalk p65".

Primary Examiner—John W. Shepperd
Attorney, Agent, or Firm—Edward W. Callan

[57] ABSTRACT

Extended horizontal definition is provided in a television system in which the wideband and narrowband chrominance components of a video signal are modulated for transmission by a subcarrier. The modulated wideband I chrominance component is filtered over a bandwidth that is antisymmetrical about the subcarrier frequency with an extended upper sideband to thereby entend the bandwidth that is available for transmission of the I chrominance component. The modulated I chrominance component is antisymmetrically filtered to enhance the relative amplitude in the extended portion of the upper sideband for transmission, and in a television receiver the modulated I chrominance component of a received video signal is filtered to have a relatively flat-response over the antisymmetrical bandwidth about the subcarrier frequency. Alternatively, the antisymmetrical filtering of the modulated I chrominance component to enhance the relative amplitude in the extended portion of the upper sideband may take place in the receiver. The I chrominance component is filtered prior to modulation over a bandwidth defined by 2.4 MHz above the subcarrier frequency and 1.5 MHz below the subcarrier frequency. The narrowband Q chrominance component is filtered prior to modulation over a bandwidth defined by 1.5 MHz above and below the subcarrier frequency.

10 Claims, 2 Drawing Sheets

EXTENDED DEFINITION TELEVISION

BACKGROUND OF THE INVENTION

Today's color television receivers provide reasonably acceptable picture quality provided that the signal to noise ratio is high. However, this level of receiver performance is achieved with partial frequency response both in the luminance and the chrominance channels. One usually considers the luminance frequency response as the dominating factor establishing picture resolution. We assume a line-comb filter, which removes some diagonal bandwidth and that the 483 active vertical lines provide effective resolution of 338 lines per picture height (Lines/PH) (i.e., a Kell factor of 0.7). Most of today's receivers provide effective horizontal bandwidth of 3.5 MHz (i.e., filter factor of 0.8 due to spot size and receiver/amplifier limitation), corresponding to effective horizontal resolution of 262 Lines/PH. The effective spatial resolution of today's NTSC is shown in FIG. 1.

Camera scanning of 525 lines can be replaced with a scanning rate of twice that or even 1125 lines with subsequent vertical filtering (or digonal filtering) and then subsampled to provide a compatible 525 line transmission signal. Overscanning in the camera has two positive effects: it reduces vertical aliasing and allows close to the full diagonal resolution of the system to be realized. If interfield filtering is used, reduction in line crawl and flicker can be achieved. While the latter improvement can be fully realized without receiver modification, the overscanning improvements would need corresponding receiver modifications to realize their full effect.

Vertical interpolation for display at the receiver can double the vertical line density at the display and thus provide the full advantages of the overscanning at the camera. A frame memory allows that with the advantage of scanning at 60 Hz non interlace. Frame comb filtering will eliminate artifacts such as cross color and cross luma. Temporal resolution loss due to frame comb filtering can be overcome by using adaptive filtering. See the discussion by G. Tong "Signal Processing for Higher Definition Television", IBA Technical Review, 21, p 13, (1983) and by M. Achiha, K. Ishikura and T. Fukinuki, "A Motion-Adaptive High Definition Converter for NTSC Color TV Signal", SMPTE J. 93, p 470, (1984). The technology for implementing the above receiver improvements exists today and new receivers employing frame memories and noninterlace interpolation displays are already being sold.

With the advent of these techniques, the NTSC format can be fully realized and thus Full NTSC provides full horizontal resoluton of 328 Lines/PH and a Kell factor of 0.9, yielding a vertical resolution of 435 Lines/PH, with a corresponding increase in diagonal resolution (see FIG. 1).

SUMMARY OF THE INVENTION

As seen in FIG. 1, when the improvements discussed above are made, thereby introducing FULL NTSC, comparable horizontal resolution increase would be required as the next step, so as to achieve a square frequency response pattern. This extension is provided by the present invention and is termed in FIG. 1 as "Extended Definition BNTSC."

The present invention provides extended horizontal definition in a television system, in which the chrominance components of a video signal are modulated for transmission by a subcarrier, by filtering the modulated wideband I chrominance component over a bandwidth that is antisymmetrical about the subcarrier frequency with an extended upper sideband to thereby extend the bandwidth that is available for transmission of the I chrominance component. Transmission of the I chrominance component requires more bandwidth than transmission of the Q narrowband chrominance component because of the relative color sensitivity of the human visual system to the colors related to the respective chrominance components. The modulated I chrominance component is antisymmetrically filtered to enhance the relative amplitude in the extended portion of the upper sideband for transmission;

In one aspect of the invention, the system includes a television reciever for receiving the modulated video signal and for filtering the I chrominance component of the received signal to provide a relatively flat-response over the antisymmetrical bandwidth about the subcarrier frequency, whereby enhancement of the relative amplitude in the extended portion of the upper sideband is accomplished in the transmitter. This aspect enables the cost of enhancing the amplitude in the upper vestigial sideband to be incurred in manufacture of the transmitters instead of the receivers, which are greater in number, Alternatively, the antisymmetrical filtering of the modulated I chrominance component to enhance the relative amplitude in the extended portion of the upper sideband may take place in the receiver.

Additional features of the present invention are described with reference to the description of the preferred embodiment.

DESCRIPTION OF THE PREFERRED EMBODIMENT

Figure 1:
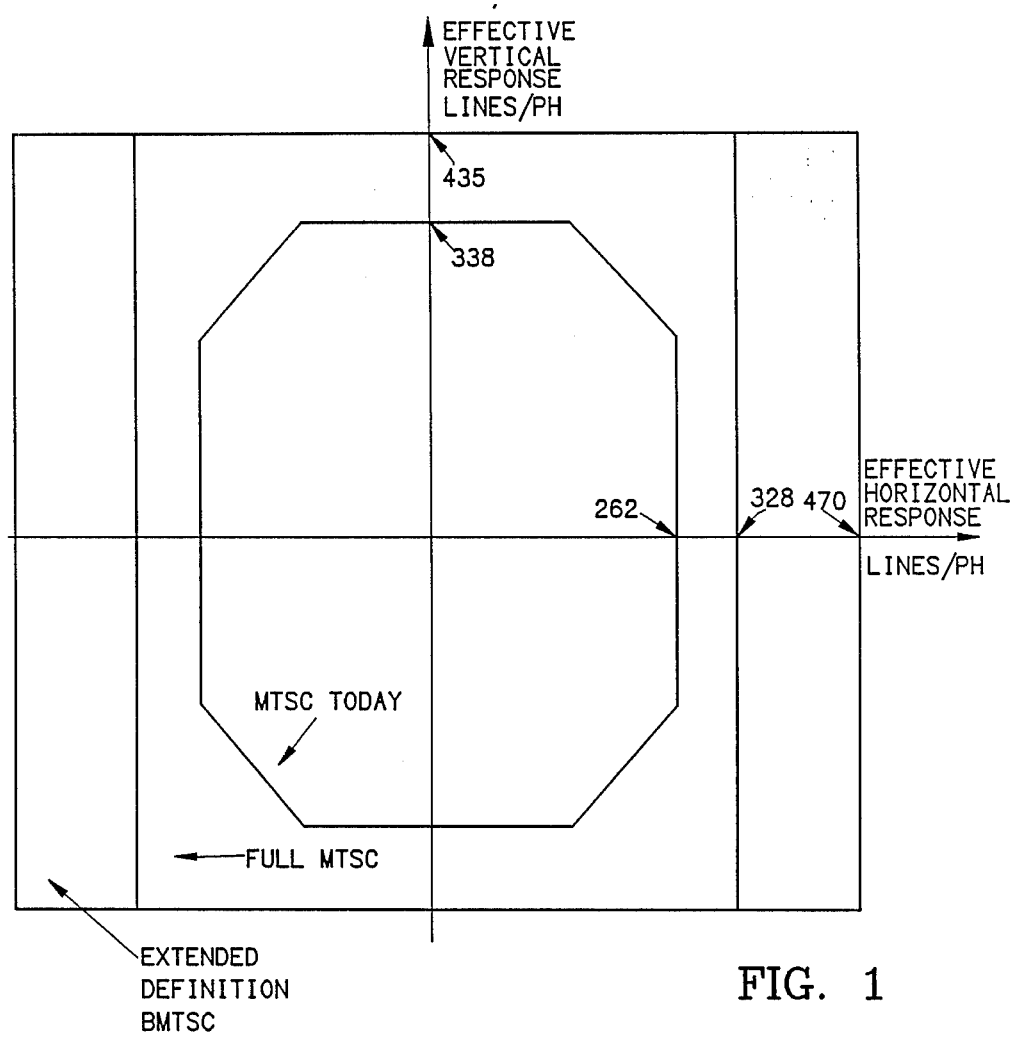
FIG. 1 illustrates the extended defintion provided by a preferred embodiment of the present invention in contrast to that according to prior art standards.

The preferred embodiment of the present invention provides extended chroma and luma horizontal resolution up to 470 effective lines per picture height with a spectral occupancy of 6 MHz. It further provides the same vertical resolution as that provided by full NTSC. The spatial resolution of BNTSC extended definition television (EDTV) is depicted in FIG. 1.

Figure 2:
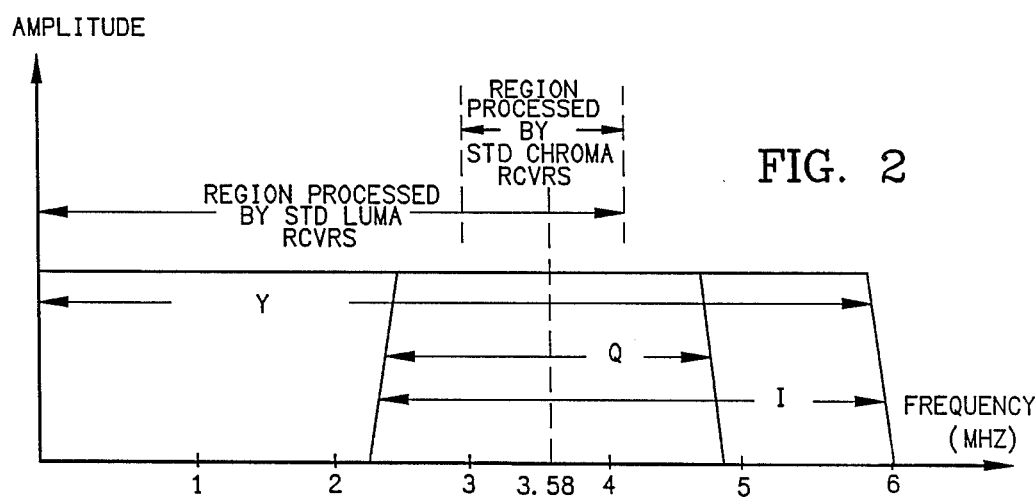
FIG. 2 is a graph showing the frequency spectrum of the color components in a video signal generated in accordance with a preferred embodiment of the present invention.

Extended definition in the horizontal direction is achieved by extending the temporal frequency span of the composite color video signal as shown in FIG. 2. The luminance bandwidth Y is increased to 6 MHz; the I chrominance component bandwidth is increased to be between 2.4 MHz above the 3.58 MHz subcarrier frequency and 1.5 MHz below the subcarrier frequency; and the Q chrominance component bandwidth is increased to be between 1.5 MHz both above and below the subcarrier frequency. The I chrominance component is transmitted in a vestigial upper sideband (VSB) in this new format, as opposed to the lower VSB format used in standard NTSC. The Q singal is transmitted double sideband.

It is assumed that the transmitted vertical frequency response is increased by oversampling and filtering as described above. Most studio cameras and telecinic equipment are capable of generating video with high horizontal resolution of up to 6 MHz. It is the encoding process of the prior art that limits the fequency response before transmission. Many of the installed video distribution and switching hardware already provide extended frequency response well above 4.2 MHz.

Figure 3:
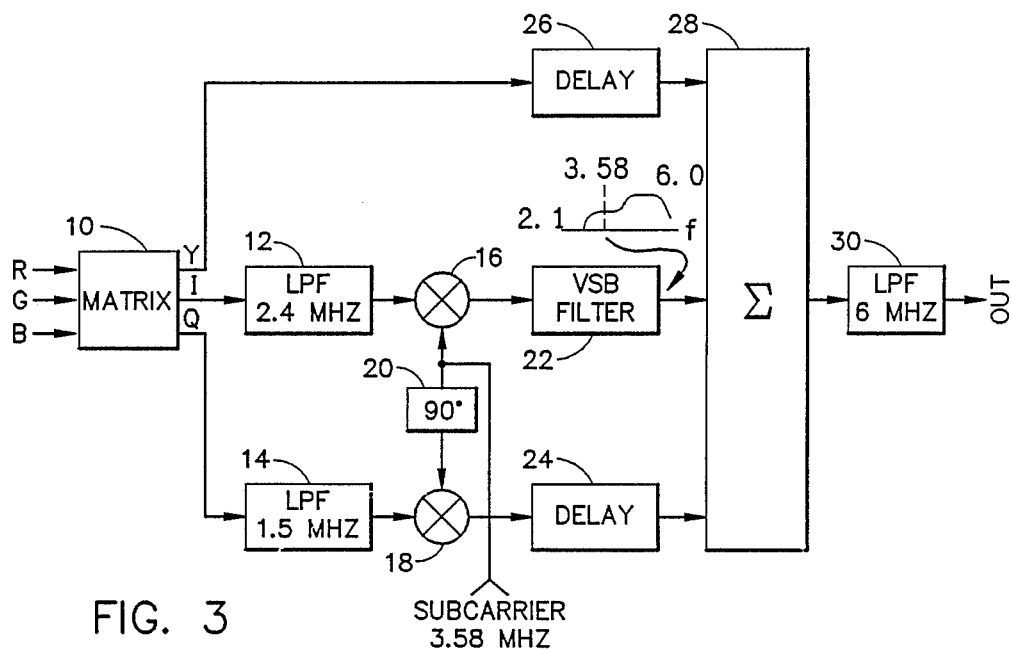
FIG. 3 is a block diagram of an extended definition encoder in a preferred embodiment of the present invention.

The system of the present invention provides a new NTSC-compatible EDTV encoder, as shown in FIG. 3, in order to increase the transmission horizontal frequency response. The EDTV encoder shown in FIG. 3 includes a color component matrix 10, a 2.4 MHz low pass filter 12. a 1.5 MHz low pass filter 14, a first mixer 16, a second mixer 18, a 90 degree phase shifter 20, a VSB antisymmetric filter 22 a first delay line 24, a second delay line 26, a signal combining unit 28 and a 6 MHz low pass output filter 30. The matrix 10 processes red (R), green (G) and blue (B) color video signals to provide a luminance component Y an I and Q chrominance components for transmission in a composite color video signal. The I chrominance component is filtered first by the 2.4 MHz low pass filter 12, then modulated by the mixer 16 with a 3.58 MHz subcarrier signal, and then filtered again by the VSB antisymmetric filter 22. The Q chrominance component is filtered by the 1.5 MHz low pass filter 14 and then modulated bu the mixer 18 with the subcarrier signal after the latter has been shifted 90 degrees by the phase shifter 20. The Q chrominance component and the luminance component Y are delayed by the delay lines 24 and 26 respectively to be in registration with the I chrominance component when all three components are combined by the unit 28.

The operation of the EDTV encoder of FIG. 3 is similar to that of a standard NTSC encoder except that it provides wider bandwidth for all components and it provides a precision upper VSB antisymmetric filter 22 for the I component, wherein the relative amplitude response is enhanced 6 dB in the extended portion of the upper sideband for distortion free decoding. The advantage of providing this VSB filter at the encoder and not at the receiver is clear since a simple flat filter can be used at the EDTV receiver without incurring the cost and distortions associated with a consumer grade VSB filter. A further advantage of using the VSB filter in the transmitter is that it provides natural preemphasis at high frequencies as required for siganl-to-noise imporvement in FM transmission. The above encoding system can be implemented digitally using digital modulators and digital filters.

Figure 4:
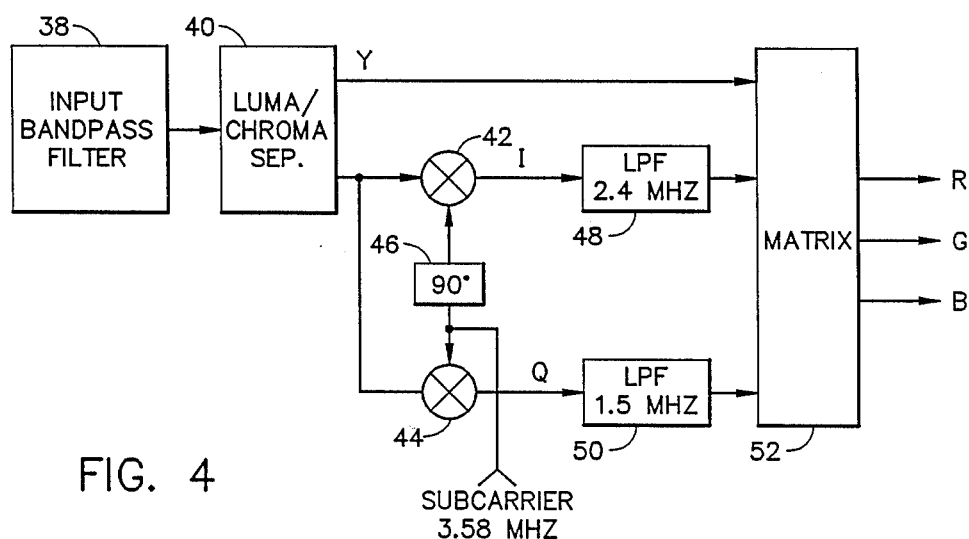
FIG. 4 is a block diagram of an extended definition decoder in a preferred embodiment of the present invention.

Referring to FIG. 4, the receive section of the receiver of the system provides extended baseband frequency response and a video decoder similar to that used by standard NTSC receiver. The decoder receives the composite signal from an input bandpass filter 38. The decoder includes a luma/chroma separator 40, a first mixer 42, a second mixer 44, a 90 degree phase shifter 46, a 2.4 MHz low pass filter 48, a 1.5 MHz low pass filter 50 and a color signal separation matrix 52. The received I chrominance component is demodulated by the mixer 42 by mixing with a 3.58 MHz subcarrier and passed through the 2.4 MHz low pass filter to the matrix 52. The received Q chrominance component is demodulated by the mixer 44 by mixing with the 3.58 MHz subcarrier, after the latter has been shifted 90 degrees by the phase shifter 46, and then passed through the 1.5 MHz low pass filter to the matrix 52. The input bandpass filter 38 and the chroma/luma separator 40 have a relatively flat response over the enchanced bandwidth about the subcarrier frequency. The chroma/luma separator 40 may be of the frame comb or line comb type, although full resolution may not be achieved with line comb filter. It is preferred that the implementation of the decoder will be fully digital.

The system of FIGS. 3 and 4 is compatible with the standard NTSC format. This is because the latter is virtually a low pass filtered version of the former, with the exception of the lower sideband extent of the Q chrominance component. Two potential artifacts due to increased Q spectral extent are considered: quadrature Q-I crosstalk and increased cross-chroma artifacts.

Virtually all existing receivers process the chrominance signal using the same 0.6 MHz chroma bandwidth on both I and Q channels. Under these conditions, no quadrature crosstalk from Q to I is introduced by the new format since for these receivers, both I and Q appear as Double Sideband (DSB) 0.6 MHz signals.

When no comb filters are used in NTSC receivers, the chrominance energy below 3.58 MHz may cause false luminance patterns. These are typically perceived as "dot structure" generated by highly saturated color transitions with high chroma subcarrier power. The major contributer to the subcarrier power is the I signal. Typicaly, the Q signal power is some 10 dB lower than that of the I signal, the dominant cross color source. This power difference is related to the fact that the Q axis in NTSC employs lower transmission gain compared with the I axis, and a corresponding higher receiver gain compared with that of the I axis. It is believed that the additional Q power from 0.6 MHz to 1.5 MHz below the subcarrier frequency in the EDTV format will produce negligible additional cross color effects when compared with standard NTSC.

The EDTV format of the present invention is particularly useful in a scrambled television system in which the audio is communicated in coded form in the horizontal blanking interval, whereby no audio subcarrier is required.

Existing satellite receivers provide badeband frequency response beyond 6 MHz. Therefore, the installed TVRO base will be fully compatible with the new EDTV format without satellite receiver modifications. Moreover, just as important is the fact that this EDTV format can be used on any NTSC channel already existing on C band which uses audio subcarriers above 6 MHz. No satellite receiver modifications are required and a TVRO owner only needs an EDTV display to take advantage of the improved signal. This EDTV opportunity should be attractive to many of the programmers on C band, since it entails no risk or extra delivery cost while presenting a differentiated product to the installed base of over 1 million TVRO customers.

The fundamental compatibility at baseband as discussed above is naturally translated to AM RF channels provided the signal is AM VSB modulated. Current FCC rules specify a group delay precorrection of 170 ns nominal at 3.58 MHz at the transmitter end (FCC Rules, Part [73.687(5)]). The introduction of the FCC delay precorrection profile may cause difficulty in EDTV receivers that process the video signal beyond 4.2 MHz.

It is therefore envisioned that the new EDTV format will not incorporate the above precorrection. It is worth noting that the FCC precorrection was introduced to compensate for group delay around the band edge of the IF amplifier where the effect of the sound trap filter becomes significant. This was particularly relevant for receivers employing LC tuned circuit filters. Most TV sets on the market today employ a SAW IF filter and sound trap which achieve the desired selectivity with very little group delay distortion at 3.58 MHz. Therefore, the majority of the existing receivers will be well matched to the new format without precorrection and in some cases that match will constitute an improvement compared to that obtained with current NTSC transmission standard.

It is assumed that when this new EDTV format is used on cable, SMATV, MMDS, or over-the-air UHF or VHF transmission, the upper adjacent channel is available and that appropriate FCC approval is obtained for Over-the-air transmissions. If no "invasion" to the upper adjacent channel is permitted, a filtered version of this format providing 4.7 MHz resolution can be contained within the current 6 MHz AM channel, with significant improvement over todays NTSC performance.

The new BNTSC EDTV format of the present invention provides substantial perceptual improvement over the NTSC format. Introduction is well justified. The full advantages of the new EDTV format can only be realized when transmission and receiver vertical frequency responses are increased by the methods discussed above.

The new EDTV format is compatible with the existing NTSC standard so that viewers who choose to forego the upgrade expense can still receive the programming using their standard receivers without substantial penalty in their picture quality of link budget requirements.

Channel co-use of the new EDTV format with the existing NTSC standard enables the new format be deliverable in as many transmission media as possible so as to maximize its reach potential. Examples of enhancements with channel co-use are the addition of the color subcarrier to the monochrome television signal and the addition of the stereo subcarrier to the monaural FM radio transmission.

An extension of the aspect ratio from 4:3 to 16:9 can be introduced by using an augmentation channel. One such augmentation channel can support three wide aspect ratio channels by broadcasting the appropriate side segments that are missing in the 4:3 channel. It is assumed that an information stream controlling the length of each margin section will be transmitted on the augmentation channel, thereby providing the desired dynamic "Pan and Scan" feature.

I claim:

1. An NTSC-compatible television system in which wideband and narrowband chrominance components of a video signal are modulated in quadrature by a 3.58 MHz subcarrier, comprising
   an encoder, including
   means for filtering the wideband chrominance component over a first predetermined baseband bandwidth;
   means for filtering the narrowband chrominance component over a second predetermined baseband bandwidth that is less than said first predetermined bandwidth;
   means for modulating the filtered wideband chrominance component with a 3.58 MHz subcarrier;
   means for modulating the filtered narrowband chrominance component in quadrature with subcarrier; and
   means for antisymmetrically filtering the modulated wideband chrominance component over an antisymmetrical bandwidth that extends above the subcarrier frequency by said first predetermined bandwidth and extends below said subcarrier frequency by said second predetermined bandwidth.

2. A system according to claim 1, wherein the encoder further comprises
   means for enhancing the amplitude of the modulated wideband chrominance component in that portion of the antisymmetrical bandwidth that extends above the subcarrier frequency by more than said second predetermined bandwidth in relation to the amplitude of the modulated wideband chrominance component in the remainder of said antisymmetrical bandwidth.

3. A television system according to claim 2, further comprising
   a television receiver for receiver for said modulated signal and including means for filtering the wideband chrominance component of the received signal to have a relatively flat response over at least the antisymmetrical bandwidth about the subcarrier frequency.

4. A television system according to claim 3, wherein said first predetermined bandwidth is greater than 1.5 MHz and said second predetermined bandwidth is greater than 0.6 MHz.

5. A televison system according to claim 4, wherein said first predetermined bandwidth is 2.4 MHz and said second predetermined bandwidth is 1.5 MHz.

6. A television system according to claim 2, wherein said first predetermined bandwidth is greater than 1.5 MHz and said second predetermined bandwidth is greater than 0.6 MHz.

7. A television system according to claim 6, wherein said first predetermined bandwidth is 2.4 MHz and said second predetermined bandwidth is 1.5 MHz.

8. A television system according to claim 1, wherein said first predetermined bandwidth is greater than 1.5 MHz and said second predetermined bandwidth is greater than 0.6 MHz.

9. A television system according to claim 8, wherein said first predetermined bandwidth is 2.4 MHz and said second predetermined bandwidth is 1.5 MHz.

10. A television system according to claim 1, further comprising
    a television receiver for receiving said modulated signal and including means for filtering the wideband chrominance component of the received signal to provide a relatively flat response over at least the antisymmetrical bandwidth about the subcarrier frequency.

* * * * *